(12) United States Patent
Bin et al.

(10) Patent No.: US 8,392,348 B2
(45) Date of Patent: Mar. 5, 2013

(54) CONSTRAINT SATISFACTION PROBLEM SOLVER
(75) Inventors: Eyal Bin, Haifa (IL); Avi Ziv, Haifa (IL)
(73) Assignee: International Business Machines Corporation, Armonk, NY (US)
( * ) Notice: Subject to any disclaimer, the term of this patent is extended or adjusted under 35 U.S.C. 154(b) by 373 days.
(21) Appl. No.: 12/868,756
(22) Filed: Aug. 26, 2010
(65) Prior Publication Data
US 2012/0054138 A1  Mar. 1, 2012
(51) Int. Cl.
*G06N 5/00* (2006.01)
(52) U.S. Cl. .......................... 706/46; 706/45
(58) Field of Classification Search .............. 706/46, 706/45
See application file for complete search history.

(56) References Cited

PUBLICATIONS

Dubois, et al., Comparison of non solvable problem solving principles issued from CSP and TRIZ, IFIP 20th World Computer Congress (WCC 2008), Milano : Italy, 2008, pp. 1-12.*
Jhala, et al., Cinematic Visual Discourse: Representation, Generation, and Evaluation, IEEE Transactions on Computational Intelligence and AI in games, vol. 2, No. 2, 2010, pp. 69-81.*
Brafman, et al., Planning with Goal Preferences and Constraints, American Association for Artificial Intelligence, 2005, pp. 1-10.*
Warwick Harvey, "Improving Linear Constraint Propagation by Changing Constraint Representation", Kluwer Academic Publishers,Boston.

* cited by examiner

*Primary Examiner* — Wilbert L Starks
(74) *Attorney, Agent, or Firm* — Ziv Glazberg; Glazberg & Applbaum Co.

(57) ABSTRACT

A CSP is modified to include an auxiliary variable. A component of a constraint of the CSP is modified to refer to the auxiliary variable instead of referring to a pair of variables. A domain for the auxiliary variable may be defined based on domains of the pair of variables. A binding constraint is added to the CSP to bind the value of the auxiliary variable with the values of the pair of variables. The modified CSP is solved using a CSP solver.

25 Claims, 4 Drawing Sheets

CONSTRAINT SATISFACTION PROBLEM SOLVER

BACKGROUND

The present disclosure relates to solving a Constraint Satisfaction Problem (CSP) in general, and to solving a CSP that comprises constraints with cyclic dependencies, in particular.

In essence, a CSP is a set of constraints over variables. The CSP is satisfied if an assignment to all variables of the CSP holds all the constraints of the CSP. The CSP may define a wide range of problems, such as for example scheduling activities (e.g., scheduling classes to professors such that each professor's personal time limitations are honored and such that in each classroom there is only one class at a time), resource allocation (which resource should be allocated to which task, where there is a limited number of resources and each task may be fulfilled using different resources out of the available resources), route calculation (e.g., how to get from point A to point B, where there are a plurality of possible intermediate points between A and B), and the like.

A CSP may be defined by a triplet $P=<V, D, C>$, where V is a set of variables (e.g., $V=\{v_1, \ldots, v_n\}$), D is a set of finite domains (e.g., $D=\{Dv_1, \ldots, Dv_n\}$), and C is a set of constraints on the value of the variables (e.g., $C=\{C_1, \ldots, C_m\}$). A variable from V is assigned a discrete value from D.

A constraint of a CSP may be expressed using a mathematical expression comprising variables, operators, constants and connectives. The expression may be formed over atomic constraints, also referred to as components, and composition operands such as 'and' (conjunction), 'or' (disjucntion'), → (implication), ⇔ (if and only if), or the like. For example (a>b) and (b>a) is a constraint comprising two components: a>b and b>a. As another example, (a>b) and ((x=1)→(a<b)) is a constraint comprising three components (a>b), (x=1), and (a<b). In some cases, there may be a plurality of constraints that are implicitly conjuncted into a single constraint.

A solution to the CSP is a single assignment of each variable of V, such that each value is selected from the pertinent domain of D, and all constraints are satisfied.

As stated above, CSPs are utilized in many different practical applications. One application is a use of a CSP in verification of a computerized device, such as a processor or a software module. A test generator, configured to generate a test to be executed/simulated during a verification phase, may generate the test based upon a satisfying assignment to one or more CSPs. A CSP may be utilized, for example, for solving scheduling activities in which computer jobs are scheduled. A CSP may be utilized, for example, for workforce management to determine a preferred allocation of personnel. A CSP may be utilized, for example, for route and place calculations.

There are a plurality of techniques to solve a CSP, such as for example Maintaining Arc Consistency (MAC), tree Search, constraint propagation, forward checking and the like.

A CSP solver may iteratively perform two actions: propagate implications of the constraints to remove values from the domains; and select a value to a variable based on the corresponding domain. In case a constraint is not satisfied or in case a domain is set to an empty set, backtracking may be performed to revoke a value selection. In some exemplary embodiments, the CSP solver may determine that the CSP cannot be assigned. For example, in case the propagation performed without any value selection induces that a domain is the empty set. As another example, the CSP may determine that based on past value selection, and as none of the past values is part of a satisfying assignment, the CSP is not satisfiable.

In some cases, there may be a cyclic dependency between two or more constraints of the CSP. In other words, in response to implications of a first constraint, implications may be performed in respect to a second constraint, and in response to the implications of the second constraint, implications may be further performed in respect to the first constraint.

BRIEF SUMMARY

One exemplary embodiment of the disclosed subject matter is a computer-implemented method for solving a Constraint Satisfaction Problem (CSP), the method performed by a computer having a processor, the method comprising: obtaining the CSP, the CSP comprising at least one constraint over a plurality of variables, the plurality of variables are associated with a plurality of domains; identifying a first constraint of the at least one constraint, the first constraint comprising a first component, the first component indicates performing a first relational operation between a first variable of the plurality of variables and a second variable of the plurality of variables; modifying the CSP to a modified CSP. Modifying the CSP comprises: adding a third variable to the CSP; determining a domain associated with the third variable based on a first domain associated with the first variable and based on a second domain associated with the second variable; adding the domain to the CSP; modifying the first component to a modified first component that indicates performing the first relational operation between the third variable and a constant; generating a third constraint that is satisfied in case both the modified first component and the first component are either both satisfied or both not satisfied; and adding the third constraint to the CSP. The method further comprises solving the modified CSP by determining whether the modified CSP is satisfiable or unsatisfiable.

Another exemplary embodiment of the disclosed subject matter is a computerized apparatus for modifying a Constraint Satisfaction Problem (CSP), the CSP comprising at least one constraint over a plurality of variables, the plurality of variables are associated with a plurality of domains, the computerized apparatus having a processor; the computerized apparatus comprising: a candidate constraint identifier configured to identify a constraint of the at least one constraint, the constraint comprising a component, the component indicates performing a relational operation between a first variable of the plurality of variables and a second variable of the plurality of variables; a CSP modifier configured to modify the CSP into a modified CSP, the CSP modifier operately coupled to: a variable adder configured to add a third variable to the CSP; a constraint modifier configured to modify the component of the constraint identifier by the candidate constraint identifier to a modified component; the modified component indicates performing the relational operation between the third variable added by the variable adder and a constant; and a variable value binder configured to determine a binding constraint and to add the binding constraint to the CSP, the binding constraint is satisfied in case the modified first component and the first component are either both satisfied or both not satisfied.

Yet another exemplary embodiment of the disclosed subject matter is a computer program product for modifying a Constraint Satisfaction Problem (CSP), the computer program product comprising: a non-transitory computer usable medium having computer usable program code embodied therewith, the computer usable program code comprising: a first computer usable program code configured to obtain the CSP, the CSP comprising at least one constraint over a plurality of variables, the plurality of variables are associated with a plurality of domains; a second computer usable program code for identifying a first constraint of the at least one constraint, the first constraint comprising a first component, the first component indicates performing a first relational operation between a first variable of the plurality of variables and a second variable of the plurality of variables; a third computer usable program code for adding a third variable to the CSP; a fourth computer usable program code for determining a domain associated with the third variable based on a first domain associated with the first variable and based on a second domain associated with the second variable; a fifth computer usable program code for adding the domain to the CSP; a sixth computer usable program code for modifying the first component to a modified first component that indicates performing the first relational operation between the third variable and a constant; a seventh computer usable program code for generating a third constraint that is satisfied in case the modified first component and the first component are either both satisfied or both unsatisfied; and an eighth computer usable program code for adding the third constraint to the CSP.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to solve a CSP. Another technical problem is to solve a CSP that contains a cyclic dependency between constraints based on two variables. A cyclic dependency may cause the CSP solver to perform in a non-efficient manner, as the cyclic dependency may cause implication propagation to be performed repeatedly based on the same constraints.

One technical solution is to perform a pre-processing of the CSP to modify the CSP to a modified CSP. The modified CSP may be equivalent to the CSP (i.e., a satisfying assignment of the CSP is extendable to a satisfying assignment of the modified CSP, and a portion of a satisfying assignment of the modified CSP is a satisfying assignment of the CSP). In some exemplary embodiments, the modified CSP may modify constraints having cyclic dependency so that the cyclic dependency is associated with a single variable. Another technical solution is to define a new variable and replace a relational operation between two variables with the relational operation between the new variable and a constant. A binding constraint may be defined to bind the satisfiability of the relation operation between the two variables with the satisfiability of the relational operation between the new variable and the constant. Yet another technical solution is to reformat a constraint so that is may be modified in accordance with the disclosed subject matter.

One technical effect of utilizing the disclosed subject matter is to provide a preprocessing process that may be useful for solving a CSP using different techniques. Another technical effect is to provide for an efficient domain reduction based on the relational operation of the new variable against the constant instead of a relatively non-efficient domain reduction based on the relation operation between two variables with associated domains. Yet another technical effect is to solve a modified CSP with a predetermined technique in a faster manner than solving the CSP with the predetermined technique.

Figure 1:
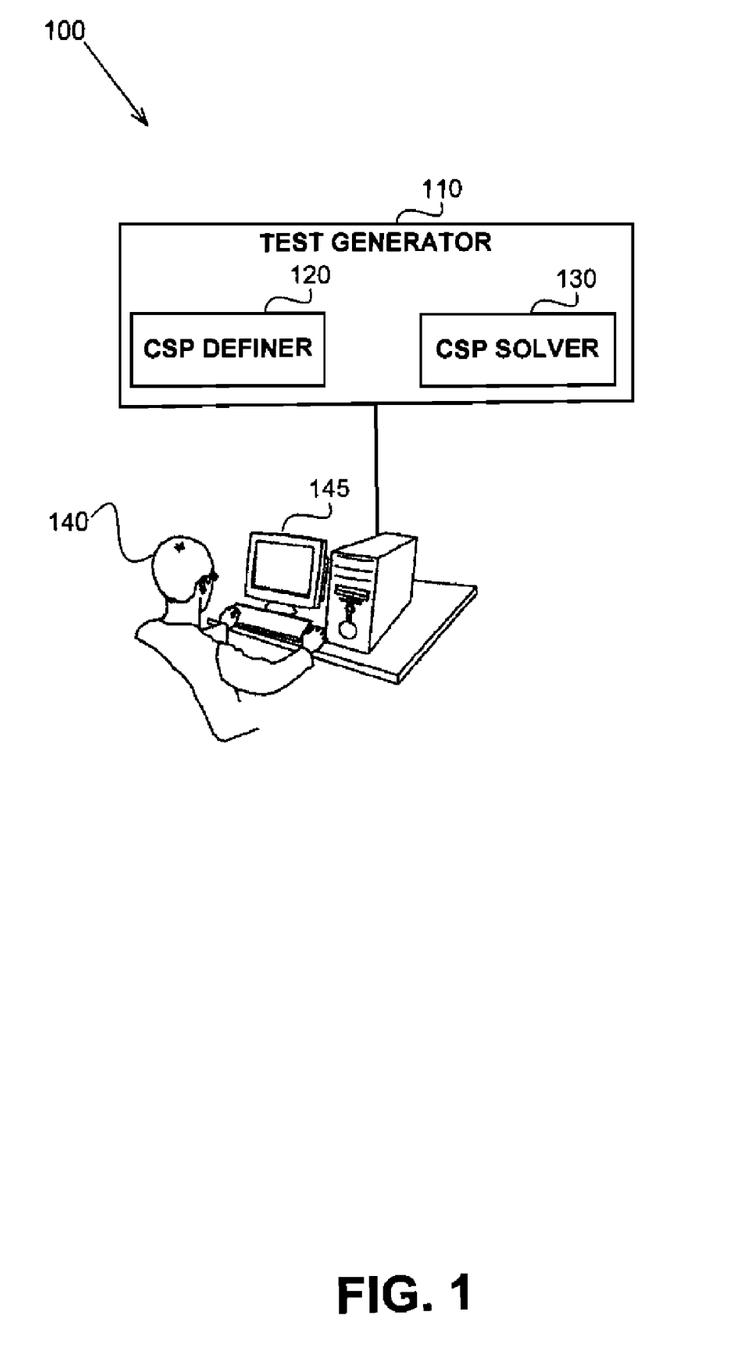
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter. A computerized environment 100 may comprise a test generator 110. The test generator 110 may comprise a CSP definer 120 that is configured to define CSPs useful for generation of a test by the test generator 110. A CSP solver 130 may be configured to solve the CSPs defined by the CSP definer 120. The test generator 110 is configured to utilize a satisfying assignment to the CSP, as determined by the CSP solver 130, to generate a test.

A user 140 may utilize a Man-Machine Interface (MMI) 145 to view the CSP defined by the CSP definer 120, a satisfying assignment determined by the CSP solver 130, an indication that a CSP is unsatisfiable determined by the CSP solver 130, a test generated by the test generator 110 or the like. In some exemplary embodiments, the CSP solver 130 may be configured by the user 140, such as by providing preferences, commands and rules.

The test generator 110 may be a computerized device implemented in hardware, software, firmware, combination thereof or the like.

Figure 2:
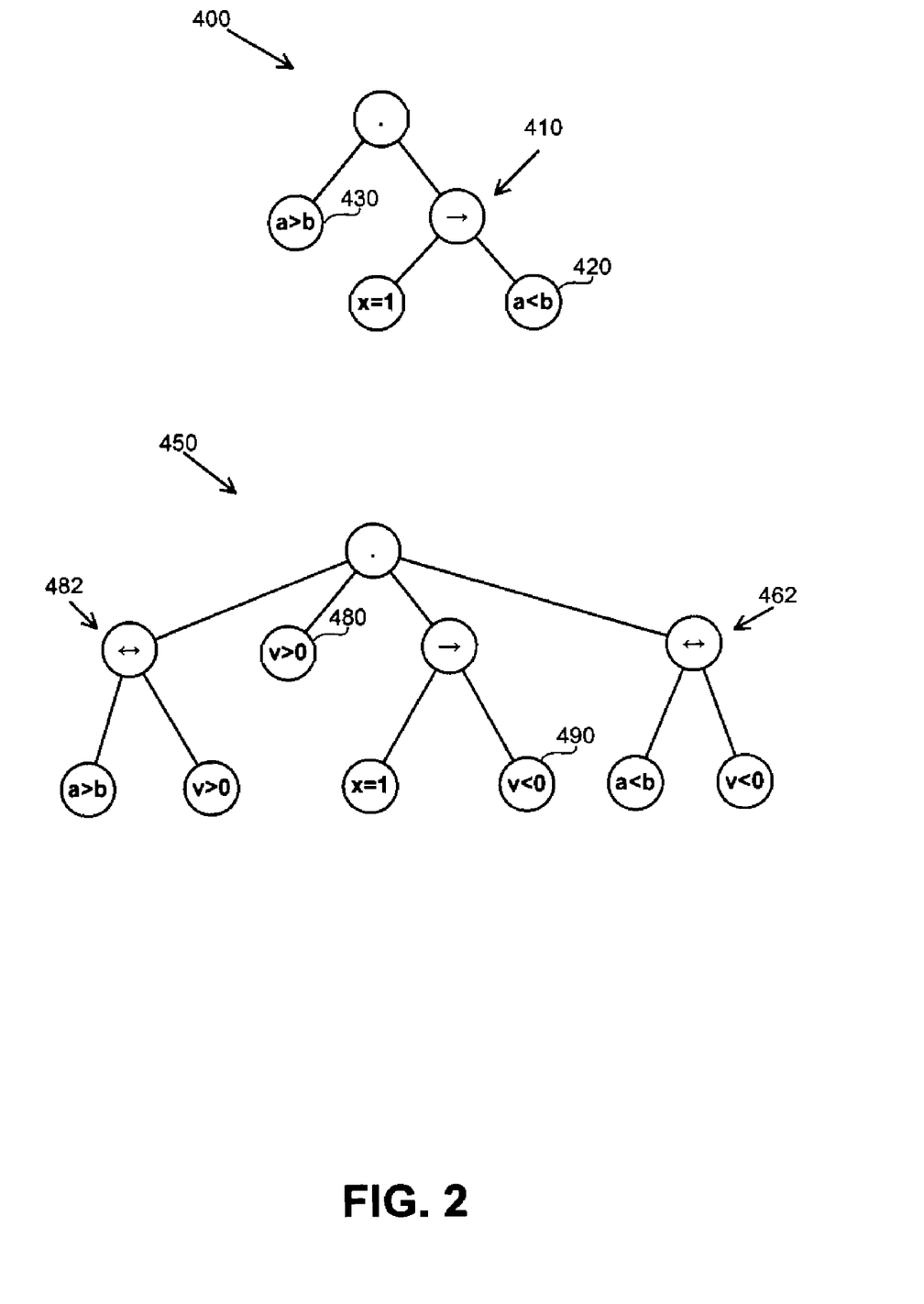
FIG. 2 shows a diagram of parse trees of constraints, in accordance with some exemplary embodiments of the disclosed subject matter.

Referring now to FIG. 2 showing a diagram of parse trees of constraints, in accordance with some exemplary embodiments of the disclosed subject matter.

A parse tree 400 of an original constraint of a CSP represents a set of two cumulative constraints: a first constraint—(x=1)→(a<b); and a second constraint a>b. A first sub-tree 410 is associated with the first constraint, and a second sub-tree 430 is associated with the second constraint.

In some exemplary embodiments, a CSP may include the original constraint ((x=1)→(a<b) and (a>b), variables {a,b, x} and domains {Da,Db,Dx}. The domains Da, Db, and Dx may include any integer between one and a million.

As there is a cyclic dependency between the first constraint and the second constraint that includes two variables (a modification of the Da domain based on the first constraint may invoke a modification of the Db domain based on the second constraint, which may invoke a modification of the Da domain based on the first constraint), domain reduction may be a relatively inefficient procedure. For example, in response to a value selection of one to the variable x, based on the first constraint, Da may be modified to exclude the value million and Db may be modified to exclude the value one. In response, and based on the second constraint Db may be modified to exclude the value million and Da may be modified to exclude the value one. In response, and based on the first constraint Db may be modified to exclude the value one and Da may be modified to exclude the value 999,999. A similar operation may be performed until either Da or Db domains are reduced to be the empty set. However, the domain reduction procedure may be inefficient as it may iterate a number of times that corresponds to O(n) where n is the size of the domains.

The original constraint represented by the parse tree 400 may be modified to a modified constraint represented by the parse tree 450. A new variable, denoted as $v_{ab}$ or simply v, may be added to the CSP. A domain Dv may be added to the CSP. The domain Dv may be defined, for example, to comprise all values between the minimal value of Da minus the maximum value of Db and between the maximal value of Da minus the minimal value of Db (i.e., range [min{Da}−max{Db}, max{Da}−min{Db}]).

The node 420 of the sub-tree 410 representing the first constraint may be modified to node 490, which corresponds to a component v<0. The first constraint may be modified from (x=1)→(a<b) to (x=1)→(v<0). A value of v may be indicative of the binary relation smaller than (i.e., "<") between "a" and "b". A new constraint, also referred to as a binding constraint, may be added to the parse tree 450. The binding constraint (a<b)↔(v<0), represented by the sub-tree 462 binds the value of the component (v<0) with the value of the component (a<b). Both components must be either both satisfied or both unsatisfied in order for the binding constraint to be satisfied. In some exemplary embodiments, a different binding constraint may be defined, such as for example v=a−b.

In a similar exemplary manner, the second constraint may be modified to be v>0 (node 480) instead of a>b (node 430).

A second binding constraint may be added to the parse tree 450 in a sub-tree 482: (a>b)↔(v>0).

In some exemplary embodiments, domain reductions performed by a CSP solver, such as 130 of FIG. 1, may be propagated on the constraints represented by the parse tree 450 in a relatively efficient manner. For example, in response to a value selection of x=1, domain Dv may be modified to exclude all values not below zero. In response and based on the node 480, the domain Dv may be further modified to exclude all values not above zero. Therefore, after a constant number of operations (corresponding to O(1)), a determination may be made that in case x=1, there is no satisfying assignment.

In some exemplary embodiments, components of constraints may be of the form a op b+const, where "a" and "b" are variables, "const" is a constant number and "op" is a relational operation such as, for example, <, >, >=, = or the like. In some exemplary embodiments, an order between the variables "a" and "b" may be different in different components. The order of the variables may be modified to any predetermined order, such as lexicographical order, an order of a node in a parse tree, or the like. For example, node 420 may originally correspond to a component stating: b>a. The order between the variables "a" and "b" may be modified so that "a" appears before "b", as is denoted in the node 420.

Figure 3:
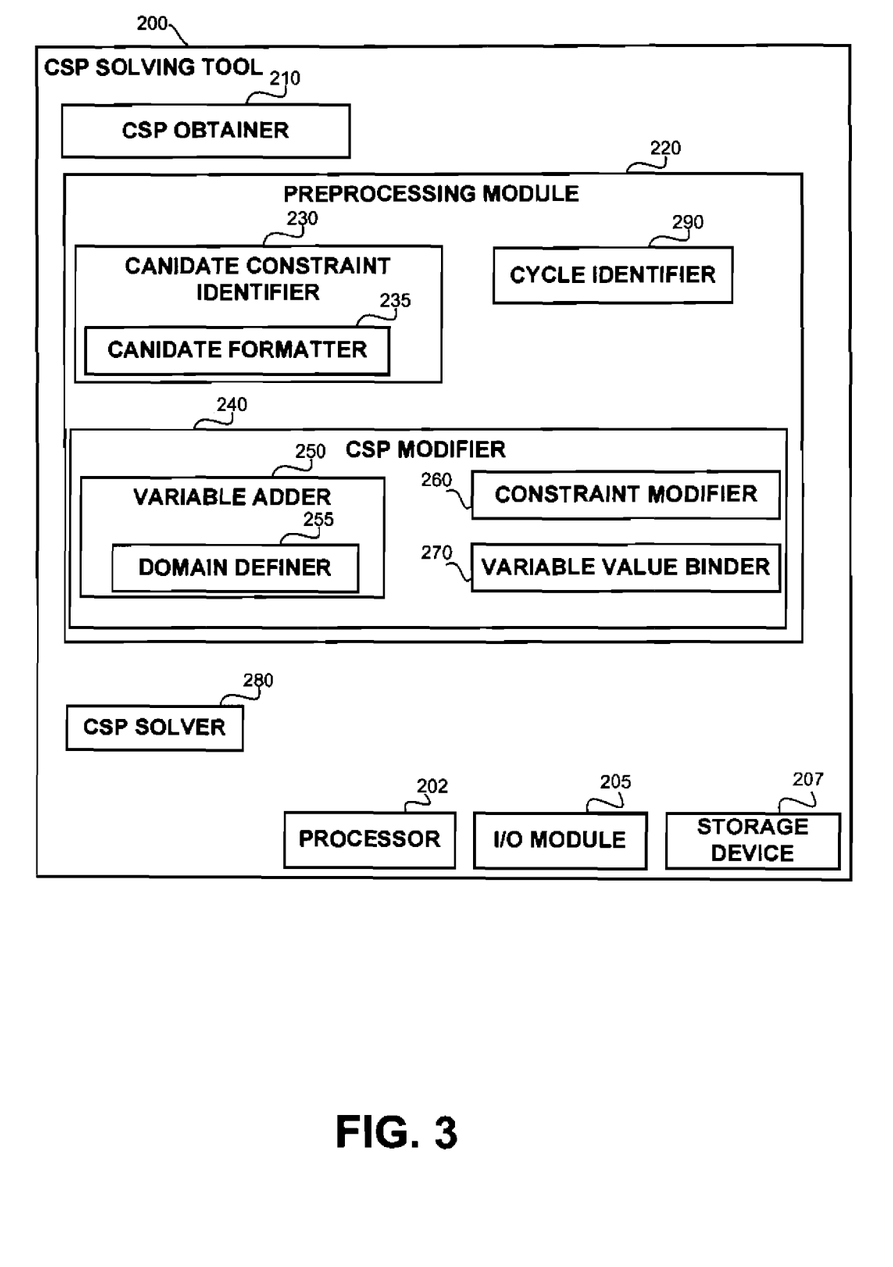
FIG. 3 shows a block diagram of a CSP solving tool, in accordance with some exemplary embodiments of the disclosed subject matter.

Referring now to FIG. 3 showing a block diagram of a CSP solving tool, in accordance with some exemplary embodiments of the disclosed subject matter. A CSP solving tool 200, such as the CSP solver 130 of FIG. 1, may be configured to receive a CSP and determine satisfiability of the CSP. The CSP solving tool 200 may be configured to provide a satisfying assignment to the CSP. The CSP solving tool 200 may solve CSPs provided by a single source, such as a test generator 110 of FIG. 1. The CSP solving tool 200 may solve CSPs provided from a plurality of sources that may or may not be related to one another.

In some exemplary embodiments, a CSP obtainer 210 may be configured to receive a CSP. The CSP obtainer 210 may utilize an I/O module 205 to receive the CSP. The CSP obtainer may obtain the CSP using an API, from a file, from a computer network or the like. The CSP obtainer 210 may obtain the CSP from one or more sources, such as for example the CSP definer 120 of FIG. 1.

In some exemplary embodiments, a preprocessing module 220 may be configured to preprocess the CSP to produce a modified CSP in accordance with the disclosed subject matter. The preprocessing module 220 may be operated prior to an operation of a CSP solver 280.

In some exemplary embodiments, the preprocessing module 220 may comprise a candidate constraint identifier 230. The candidate constraint identifier 230 may be configured to identify a constraint of the CSP that may be modified by the preprocessing module 220. In some exemplary embodiments, the constraint may comprise a component of the form a op b+const, where "a" and "b" are variables, "op" is a relational operation, such as a linear relational operation, and "const" is a constant number which may or may not be zero. In some exemplary embodiments, the candidate constraint identifier 230 may be configured to traverse a parse tree, such as 400 of FIG. 2, to identify a node, such as nodes 420 and 430.

In some exemplary embodiments, a candidate formatter 235 may be configured to modify a component to be in accordance with a predetermined format in accordance with the disclosed subject matter. For example, the candidate formatter 235 may modify an order of the variables. As another example, the candidate formatter 235 may modify a constraint by performing algebraic operations. For example, consider a component a−3>b, the component may be formatted by the candidate formatter 235 to be a>b+3.

In some exemplary embodiments, the preprocessing module 220 may comprise a CSP modifier 240. The CSP modifier 240 may be configured to modify the CSP obtained by the CSP obtainer 210 to a modified CSP.

In some exemplary embodiments, a variable adder 250 may be configured to add a variable to the CSP. The variable adder 250 may add a variable that may be indicative of a relation between two variables. For example, the added variable may be set as a subtraction of a first variable from a second variable (i.e., x=a−b). As another example, a relation between the value of the added variable and a constant may be indicative of a relation between the two variables. In some exemplary embodiments, a plurality of variables may be added. An added variable may be associated with a different pair of variables.

In some exemplary embodiments, a domain definer 255 may be configured to define a domain to the added variable. The domain may be defined based on a predetermined domain, based on domains of the pair of variables or the like. In some exemplary embodiments, the domain may be defined as all values in the range [min{Da}−max{Db}, max{Da}−min{Db}], where Da is the domain of the first variable and Db is the domain of the second variable.

In some exemplary embodiments, a constraint modifier 260 may be configured to modify a portion of a constraint of the CSP. The portion of the constraint may be a component identified by the candidate constraint identifier 230. The constraint modifier 260 may modify the component to indicate a relation between the added variable and a constant number instead of indicating the relation between the first variable and a second variable to which a constant value may be added (e.g., v op const instead of: a op (b+const)).

In some exemplary embodiments, a variable value binder 270 may be configured to add a binding constraint to the CSP. The binding constraint may bind a value of the added variable with the values of the two variables. In some exemplary embodiments, the binding constraint may be: v=a−b, where "v" is the added variable and "a" and "b" are the two variables. In some exemplary embodiments, the binding constraint may be: (v op const)↔(a op (b+const)), where "v" is the added variable, "a" and "b" are the two variables, "op" is the relational operator, "const" is a constant, and (a op (b+const)) is the component identified by the candidate constraint identifier 230 (optionally after reformatting is performed by the candidate formatter 235).

In some exemplary embodiments, the preprocessing module 220 may comprise a CSP solver 280. The CSP solver 280 may be configured to solve a CSP. The CSP solver 280 may apply techniques, such as for example MAC, to solve the CSP. In some exemplary embodiments, the CSP solver 280 may perform iteratively domain reduction based on implication propagation and value selection. The CSP solver 280 may perform backtracking when needed.

In some exemplary embodiments, the CSP solver 280 may be configured to provide an indication whether or not the CSP is satisfiable. In some exemplary embodiments, the CSP solver 280 may be configured to provide a satisfying assignment of the CSP in case the CSP is satisfiable. In some exemplary embodiments, the CSP may be configured to provide an output to a user, such as 140 of FIG. 1, using an I/O module 205.

In some exemplary embodiments, the preprocessing module 220 may comprise a cycle identifier 290. The cycle identifier 290 may be configured to identify a cyclic dependency between constraints. The cyclic dependency may be based on a pair of variables participating in the constraint. In response to a determination by the cyclic identifier 290 that a cyclic dependency exists, the candidate constraint identifier 230 may be operated to identify two or more candidate constraints that are involved in the cyclic dependency.

In some exemplary embodiments, an Input/Output (I/O) module 205 may be utilized to provide an output to and receive input from a user, such as 140 of FIG. 1.

In some exemplary embodiments, the CSP solving tool 200 may comprise a processor 202. The processor 202 may be a Central Processing Unit (CPU), a microprocessor, an electronic circuit, an Integrated Circuit (IC) or the like. The processor 202 may be utilized to perform computations required by the CSP solving tool 200 or any of it subcomponents.

In some exemplary embodiments, the CSP solving tool 200 may comprise a storage device 207. The storage device 207 may be a memory, a Random Access Memory (RAM), a Flash drive, a hard disc, a Read Only Memory (ROM), a computer-readable media or the like.

Figure 4:
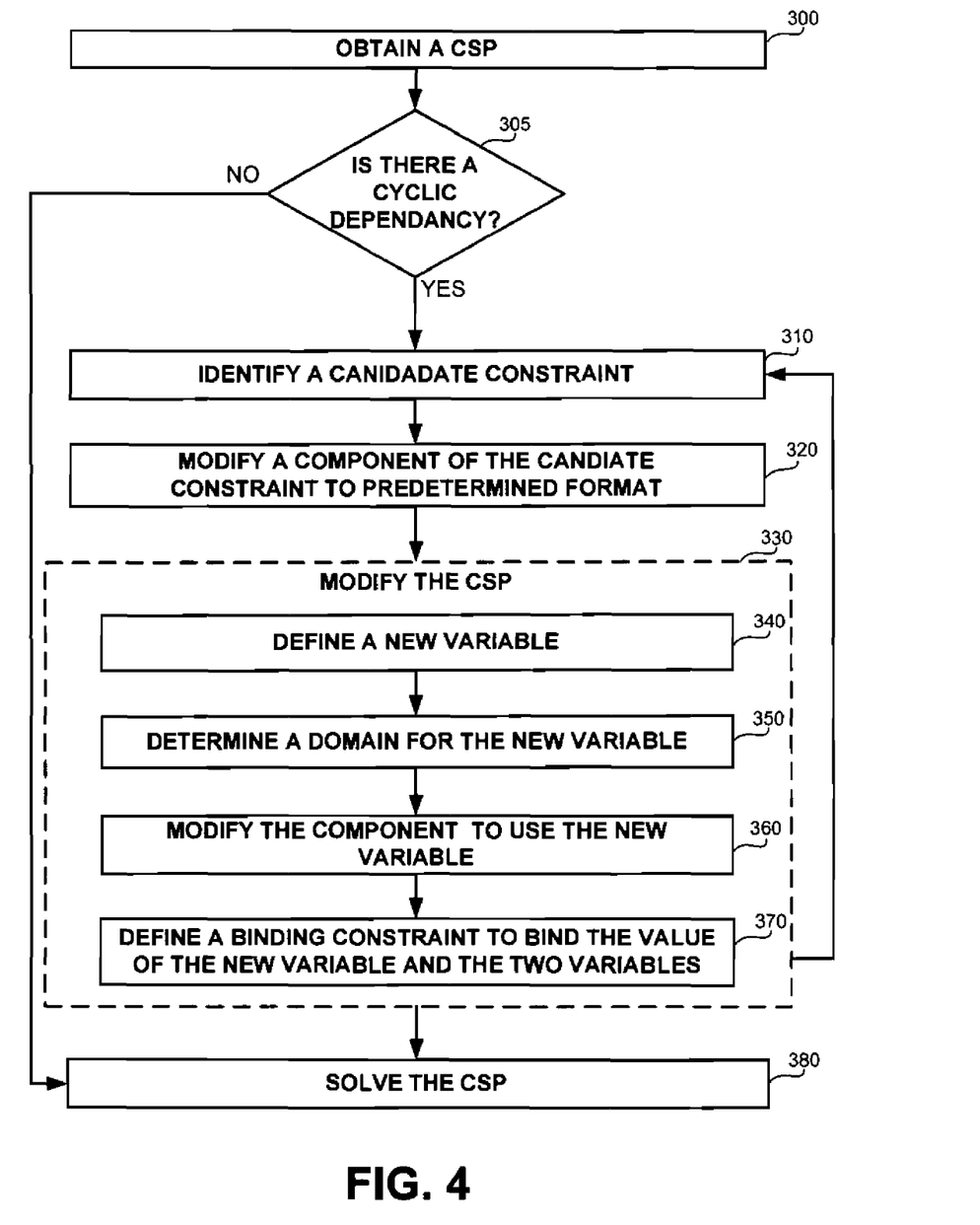
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter.

In step 300, a CSP may be obtained. The CSP may be obtained by a CSP obtainer, such as 210 of FIG. 3.

In step 305, a determination whether or not there is a cyclic dependency in the CSP may be determined. The determination may be performed by a cycle identifier, such as 290 of FIG. 3. In case there is no cyclic dependency in the CSP, the CSP may be solved in step 380. Otherwise, steps 310-370 may be performed.

In step 310, a candidate constraint may be identified. The candidate constraint may be identified by a candidate constraint identifier, such as 230 of FIG. 3.

In step 320, a component of the candidate constraint may be modified based on a predetermined format. The modification of the component may be performed by a candidate formatter, such as 235 of FIG. 3.

In step 330, the CSP may be modified. The CSP may be modified by a CSP modifier, such as 240 of FIG. 3.

In step 340, a new variable may be defined and added to the CSP. The new variable may be defined and added by a variable adder, such as 250 of FIG. 3. In some exemplary embodiments, in case steps 310-370 are performed iteratively, the new variable may not be defined in each iteration. For example, in case a pair of variables is replaced by a new variable, the same new variable need not be added twice in case the pair of variables is determined to be replaced in another component.

In step 350, a domain for the new variable may be determined. The domain may be determined by a domain definer, such as 255 of FIG. 3.

In step 360, a component of the candidate constraint identified in step 310 may be modified. In some exemplary embodiments, the component may be modified to refer to and/or utilize the value of the new variable. In some exemplary embodiments, the modification may include changing the component from the format: a op b+const to the format: v op const. The modification may be done by a constraint modifier, such as 260 of FIG. 3.

In step 370, a binding constraint may be defined to bind the value of the new variable and the two variables. The binding constraint may be added to the CSP. The binding constraint may defined and added to the CSP by a variable value binder, such as 270 of FIG. 3.

In some exemplary embodiments, there may be more than one candidate for modification in accordance with the disclosed subject matter. In case another component may be modified in accordance with the disclosed subject matter, step 310 may be performed to locate a second component. In some exemplary embodiments, the second component may be comprised by the same candidate constraint or by a different candidate constraint. In case there are no additional components to be modified, step 380 may be performed.

In step 380, the modified CSP, as modified in step(s) 330 may be solved. The modified CSP may be solved by a CSP solver, such as 280 of FIG. 3.

In some exemplary embodiments, steps 310-370 may be performed as a preprocessing step prior to solving the CSP. Steps 310-370 may be performed by a preprocessing module, such as 220 of FIG. 3.

In some exemplary embodiments, a candidate constraint, such as identified in step 310, may comprise two or more components that may be changed in accordance with the disclosed subject matter. In such a case, step 330 may be performed two or more times, each time in respect to a different component.

In some exemplary embodiments, a computerized device may implement the following algorithm in accordance with the disclosed subject matter:

Obtain a CSP to be solved.
Find all clauses of constraints that may be modified in accordance with the disclosed subject matter. The clauses may be reformatted if needed. An order of appearance of variables in the clauses may be modified to provide for a consistent order.
For each pair of variables "a" and "b" that appears in more than one clause found in the CSP:
  Add an auxiliary variable "v". A domain of the variable "v" may be defined.
  For each relevant clause in which the variables "a" and "b" appear:
    Replace the clause: a op (b+const) with the clause: v op const.
    Add a binding constraint, such as: (v op const)↔(a op (b+const)), (v=a−b), or the like. The binding constraint may be added in conjunction to other constraints of the CSP.
Solve the modified CSP and display results.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for solving a Constraint Satisfaction Problem (CSP), the method performed by a computer having a processor, the method comprising:
    obtaining the CSP, the CSP comprising at least one constraint over a plurality of variables, the plurality of variables are associated with a plurality of domains;
    identifying a first constraint of the at least one constraint, the first constraint comprising a first component, the first component indicates performing a first relational operation between a first variable of the plurality of variables and a second variable of the plurality of variables;
    modifying the CSP to a modified CSP; said modifying the CSP comprises:
        adding a third variable to the CSP;
        determining a domain associated with the third variable based on a first domain associated with the first variable and based on a second domain associated with the second variable;
        adding the domain to the CSP;
        modifying the first component to a modified first component that indicates performing the first relational operation between the third variable and a constant;
        generating a third constraint that is satisfied in case the modified first component and the first component are either both satisfied or both unsatisfied; and
        adding the third constraint to the CSP; and
    solving the modified CSP by determining satisfiability of the modified CSP.

2. The computer-implemented method of claim 1, wherein the first component is equivalent to v1 op (v2+const); wherein v1 is the first variable; wherein v2 is the second variable; wherein op is the first relational operation; and wherein const is a constant value.

3. The computer-implemented method of claim 2, further comprises transforming the first component to v1 op (v2+const).

4. The computer-implemented method of claim 2, wherein the modified first component is v3 op const, wherein v3 is the third variable.

5. The computer-implemented method of claim 4, wherein the third constraint is (v3 op const)$\leftrightarrow$(v1 op (v2+const)).

6. The computer-implemented method of claim 4, wherein the third constraint is v3=v1−v2.

7. The computer-implemented method of claim 1, further comprises:
    identifying a second constraint of the at least one constraint, the second constraint comprising a second component, the second component indicates performing a second relational operation between the first variable and the second variable;
    wherein said modifying the CSP further comprises:
        modifying the second component to a modified second component that indicates performing the second relational operation between the third variable and a second constant;
        determining a fourth constraint that is satisfied in case the modified second component and the second component are either both satisfied or unsatisfied; and
        adding the fourth constraint to the CSP.

8. The computer-implemented method of claim 7, further comprises changing an order of appearance of the first variable and the second variable in the second component to correlate with an order of appearance of the first variable and the second variable in the first component.

9. The computer-implemented method of claim 7:
    wherein the first component is equivalent to v1 op1 (v2+const1);
    wherein the second component is equivalent to v1 op2 (v2+const2);
    wherein the modified first component is v3 op1 const1;
    wherein the modified second component is v3 op2 const2; and
    wherein v1 is the first variable; wherein v2 is the second variable; wherein Op1 is the first relational operation; wherein const1 is a first constant value; wherein op2 is the second relational operation; wherein const2 is a second constant value; wherein v3 is the third variable.

10. The computer-implemented method of claim 9, further comprises transforming the second component to v1 op2 (v2+const2).

11. The computer-implemented method of claim 9, wherein the third constraint is (v3 Op1 const1)$\leftrightarrow$(v1 op1 (v2+const1)); and wherein the fourth constraint is (v3 op2 Const2)$\leftrightarrow$(v1 op2 (v2+const2)).

12. The computer-implemented method of claim 9, wherein the third constraint and the fourth constraint are v3=v1−v2.

13. The computer-implemented method of claim 9, wherein the third constraint is equivalent to the fourth constraint.

14. The computer-implemented method of claim 1, further comprises verifying that there is a cyclic dependency between the first constraint and a second constraint of the at least one constraint that is associated with the first variable and the second variable.

15. The computer-implemented method of claim 1, wherein the first constraint consists of the first component.

16. The computer-implemented method of claim 1, wherein the third constraint that is satisfied in case both the modified first component and the first component are either both satisfied or both unsatisfied.

17. A computerized apparatus for modifying a Constraint Satisfaction Problem (CSP), the CSP comprising at least one constraint over a plurality of variables, the plurality of variables are associated with a plurality of domains, the computerized apparatus having a processor; the computerized apparatus comprising:
    a candidate constraint identifier configured to identify a constraint of the at least one constraint, the constraint comprising a component, the component indicates performing a relational operation between a first variable of the plurality of variables and a second variable of the plurality of variables;
    a CSP modifier configured to modify the CSP into a modified CSP, the CSP modifier operately coupled to:
        a variable adder configured to add a third variable to the CSP;

a constraint modifier configured to modify the component of the constraint identifier by said candidate constraint identifier to a modified component; the modified component indicates performing the relational operation between the third variable added by said variable adder and a constant; and a variable value binder configured to determine a binding constraint and to add the binding constraint to the CSP, the binding constraint is satisfied in case the modified first component and the first component are either both satisfied or both unsatisfied.

18. The computerized apparatus of claim 17, wherein the computerized apparatus is operately coupled to a CSP solver; the CSP solver configured to determine satisfiability of the modified CSP; and wherein the computerized apparatus comprises a CSP obtainer configured to obtain the CSP.

19. The computerized apparatus of claim 17, wherein said candidate constraint identifier is configured to identify at least one constraint; and wherein the constraint modifier is configured to modify each of the at least one constraint.

20. The computerized apparatus of claim 17, further comprises a cycle identifier configured to identify a cyclic dependency between at least two constraints of the at least one constraint, the cyclic dependency is associated with the first variable and the second variable.

21. The computerized apparatus of claim 17, wherein said variable adder further comprises a domain definer; wherein said domain definer is configured to define a domain associated with the third variable based on a first domain associated with the first variable and based on a second domain associated with the second variable.

22. The computerized apparatus of claim 17, wherein said candidate constraint identifier is configured to identify the constraint comprising the component that is equivalent to v1 op (v2+const); wherein v1 is the first variable; wherein v2 is the second variable; wherein op is the relational operation; and wherein const is a constant value.

23. The computerized apparatus of claim 22, wherein said candidate constraint identifier further comprises a candidate formatter configured to transform the component to v1 op (v2+const).

24. The computerized apparatus of claim 22, wherein said candidate constraint identifier further comprises a candidate formatter configured to modify an order between the first variable and the second variable based on a predetermined order.

25. A computer program product for modifying a Constraint Satisfaction Problem (CSP), the computer program product comprising:

a non-transitory computer usable medium having computer usable program code embodied therewith, the computer usable program code comprising:

a first computer usable program code configured to obtain the CSP, the CSP comprising at least one constraint over a plurality of variables, the plurality of variables are associated with a plurality of domains;

a second computer usable program code for identifying a first constraint of the at least one constraint, the first constraint comprising a first component, the first component indicates performing a first relational operation between a first variable of the plurality of variables and a second variable of the plurality of variables;

a third computer usable program code for adding a third variable to the CSP;

a fourth computer usable program code for determining a domain associated with the third variable based on a first domain associated with the first variable and based on a second domain associated with the second variable;

a fifth computer usable program code for adding the domain to the CSP;

a sixth computer usable program code for modifying the first component to a modified first component that indicates performing the first relational operation between the third variable and a constant;

a seventh computer usable program code for generating a third constraint that is satisfied in case the modified first component and the first component are either both satisfied or both unsatisfied; and an eighth computer usable program code for adding the third constraint to the CSP.

\* \* \* \* \*